April 2, 1963 M. E. UNTIEDT 3,083,966

FOUL DETECTING AND INDICATING MECHANISM

Filed April 11, 1960 2 Sheets-Sheet 1

Inventor
Miles E. Untiedt
By Hofgren, Brady, Wegner,
Allen & Stellman
Attorneys

April 2, 1963 M. E. UNTIEDT 3,083,966
FOUL DETECTING AND INDICATING MECHANISM
Filed April 11, 1960 2 Sheets-Sheet 2
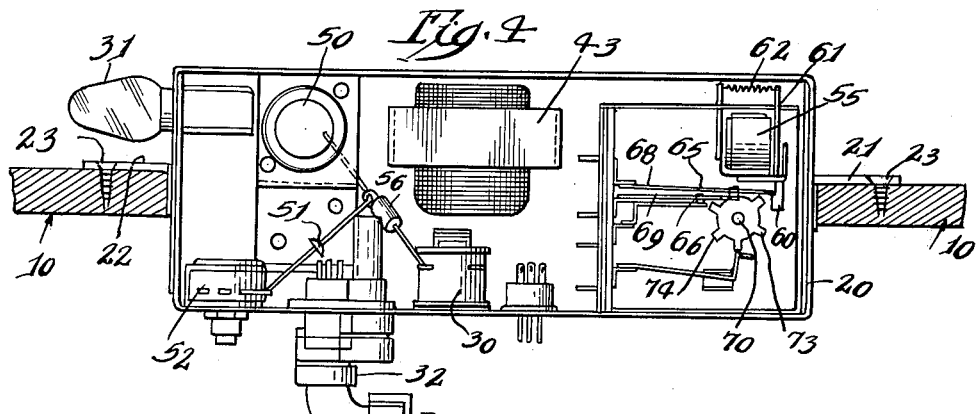
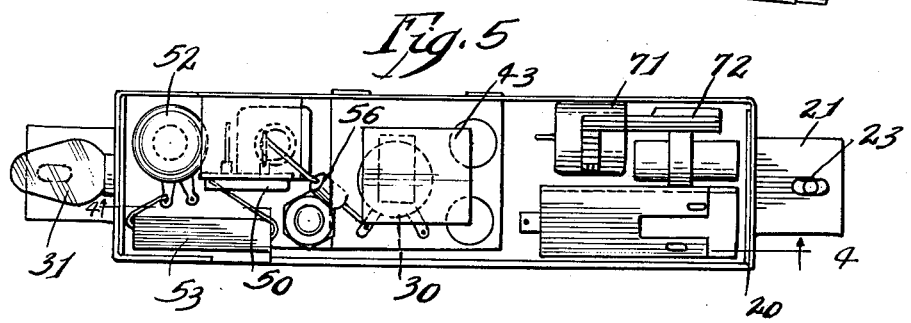
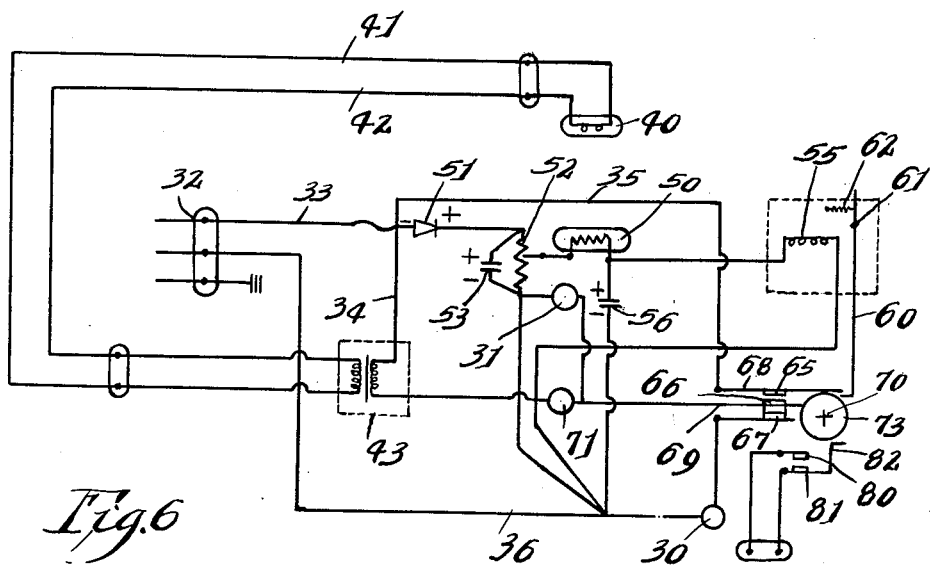
Inventor
Miles E. Untiedt
By Hofgren, Brady, Wegner,
Allen & Stellman
Attorneys

United States Patent Office 3,083,966
Patented Apr. 2, 1963

3,083,966
FOUL DETECTING AND INDICATING
MECHANISM
Miles E. Unfiedt, Muskegon, Mich., assignor to Brunswick Corporation, a corporation of Delaware
Filed Apr. 11, 1960, Ser. No. 21,248
11 Claims. (Cl. 273—50)

This invention relates to a mechanism for detecting and indicating a foul incurred during a game of bowling and more particularly to a self-contained unit positionable in line with the foul line of a bowling alley and having the detecting and indicating mechanism disposed therein.

An object of this invention is to provide a new and improved foul detecting and indicating apparatus.

Another object of this invention is to provide a compact, self-contained foul detecting and indicating mechanism in a housing which is positionable in line with the foul line of a bowling alley and which does not require any components located elsewhere such as behind a masking unit of an alley.

Another object of the invention is to provide a foul detecting and indicating unit in which a foul indicating mechanism is caused to operate by means of a foul detection mechanism including a resistance type photo cell connected in circuit with means for initiating operation of the foul indicating mechanism and variable means for imposing a time delay in initiation of the foul indicating mechanism.

Further objects and advantages will become apparent from the following detailed description taken in connection with the accompanying drawings in which:

FIG. 4 is a vertical section taken generally along the line 4—4 in FIG. 5 and with the housing enclosing the parts omitted;

FIG. 5 is a plan view of the structure shown in FIG. 4, again with the housing omitted; and FIG. 6 is a wiring diagram of the foul detecting and indicating circuits.

Figure 1:
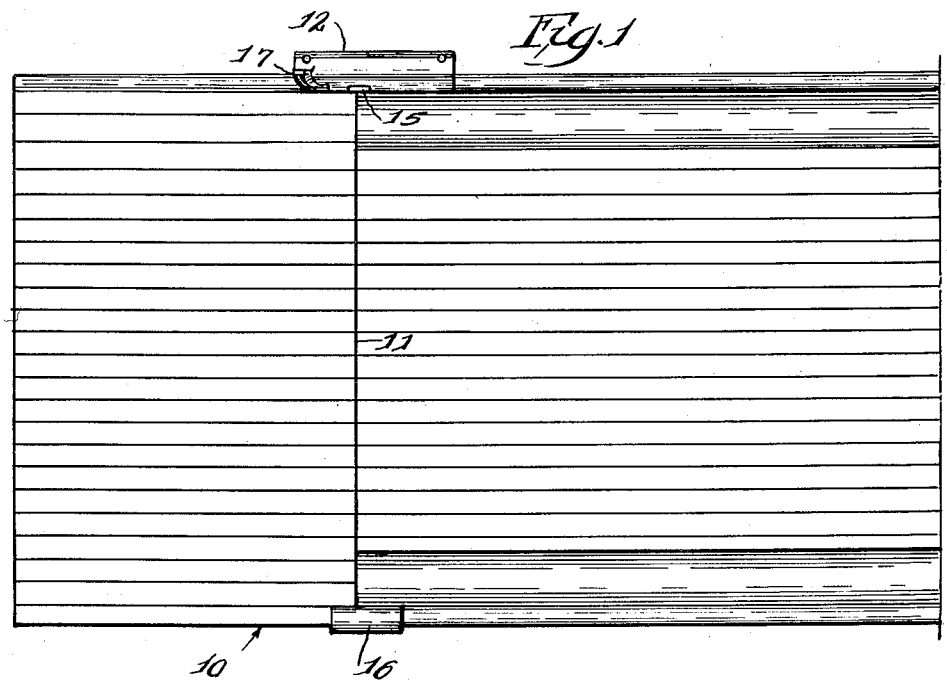
FIG. 1 is a fragmentary plan view of a bowling alley with the foul detecting and indicating unit shown in association therewith.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in FIG. 1, a bowling alley indicated generally at 10 has a foul line 11. A housing 12 for the foul detecting and indicating apparatus is positioned to have a light receiving opening 15 therein directly coincide with the foul line. Light is received in the opening 15 from a separate housing having a source of light which is directed from the housing 16 along the foul line 11.

Figure 2:
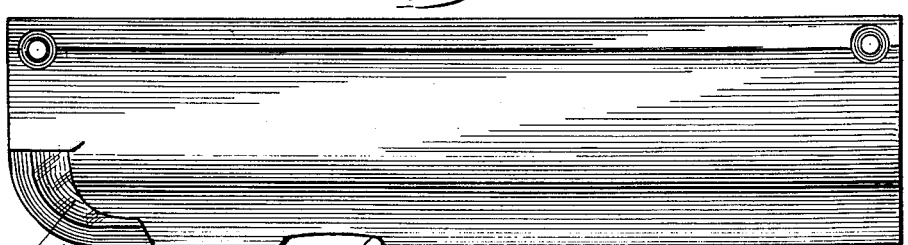
FIG. 2 is a plan view on an enlarged scale of the unit housing.
Figure 3:
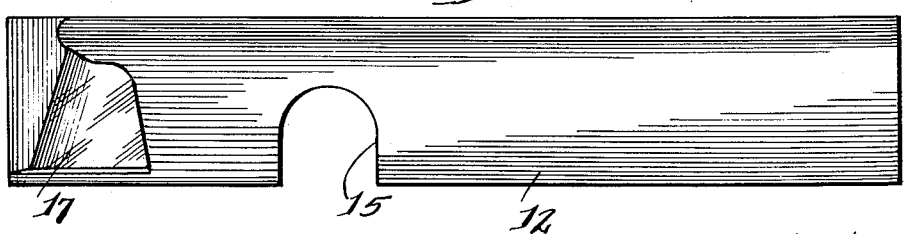
FIG. 3 is a front elevational view of the unit housing shown in FIG. 2.

As seen in FIGS. 2 and 3, the housing 12 additionally has a light transmitting area 17 whereby a foul indicating light positioned within the housing, when energized, transmits light through said area and directs it toward the bowler's end of an alley whereby the occurrence of a foul is visibly indicated.

The housing 12 rests upon the top surface of the alley bed and encloses a frame or casing 20 which has a pair of brackets 21 and 22 through which screws 23 extend into the bed of the alley 10. The frame 20, as noted in FIG. 4, is fitted within an opening in the alley bed and extends partly above and into the housing 12 while a part of the casing 20 is beneath the top of the alley bed.

The casing 20 carries all of the components of the foul detecting and indicating apparatus and reference is now made to the wiring diagram in FIG. 6 for a description of the components in circuit and reference is made back to FIGS. 4 and 5 with regard to structural details of these components.

The circuit has foul indicating elements including an audible signalling device 30 in the form of a buzzer and a visual indicator in the form of a light 31 with the light 31 mounted on the casing 20 at one end thereof in position to be adjacent the area 17 of the housing 12. When the light is energized, light is transmitted through the area 17 to visually indicate the occurrence of a foul. The circuit is connected to a terminal 32 of a 117 volt alternating current line with one side of the line being indicated at 33, 34 and 35 and the other side of the line being indicated at 36.

A source of light 40 within housing 16 and operating on a reduced voltage is connected by lines 41 and 42 to a transformer 43 connected between the side 34 of the line and the side 36 of the line.

The foul detecting apparatus embodies a resistance type photo cell 50 which is in line with the source of light 40. The photo cell 50 is connected to the side 33 of the line through a half wave rectifier in the form of a diode 51 which is connected to a load 52 in the form of an adjustable potentiometer which is shunted by a capacitor 53. The photo cell 50 is connected in series with a relay having a solenoid 55. The solenoid is normally energized with flow of current therethrough and drops out when the current flowing therethrough drops to a predetermined value.

Means are provided for causing a time delay in drop out of the solenoid 55 in the form of a condenser 56 connected in series with the photocell 50 which acquires a charge. The resistance type photo cell 50 normally conducts a current and when the light to the photocell is broken the resistance of the photocell increases and the current stored in the condenser discharges to maintain the solenoid 55 energized for a period of time above the predetermined drop out value. This avoids obtaining a false foul operation as when a bowling ball crosses the foul line.

Means for varying the time delay includes the adjustable potentiometer 52 which sets the amount of voltage applied to the photo cell 50. By adjusting the potentiometer 52, the current normally flowing through the solenoid 55 may be increased or decreased to thereby vary the time required for the current flowing to the current sensitive solenoid to drop to the predetermined drop out value.

The solenoid 55 controls the action of a latch member 60 which is pivotally mounted as indicated at 61 (FIG. 4) and is normally spring-urged to a release position by a spring 62. When the relay solenoid 55 is locked in, the spring 62 is inoperative and the latch 60 is in its latch position. The latch 60 holds a switch contact 65 in spaced relation from a central movable contact 66. The central contact 66 is normally in closed relation with a contact 67. The contacts 65 and 66 are mounted on flexible blades 68 and 69, respectively, for movement. A shaft 70, as shown in FIGS. 4 and 5, is driven from a timer motor 71 through a gear reduction 72 and has a timing cam 73 mounted thereon. The timing cam 73 has a series of spaced projections 74 which are out of alignment with the blade 68 mounting the movable contact 65 but which may contact the blade 69 mounting the central contact 66.

In operation, when a foul occurs the light to the photo cell 50 is reduced to thereby build up the resistance in the circuit and reduce the current flowing through solenoid 55 to a value below the predetermined drop out value. This results in release of the latch 60 whereby the spring 62 may pivot the latch to clear the contact blade 68 whereby the normally open contact 65 may drop down into contact with the central contact 66. This results in connecting the timer motor 71 and the light 31 across the sides 33 and 36 of the line and also the buzzer 30 by engagement between the contacts 66 and 67. Both an audible and visual signal are then given to indicate the occurrence of a foul and the timer motor 71 is operating to slowly rotate the timer cam 73. In approximately 3 seconds, a projection 74 on the timer cam 73 contacts the blade 69 of the central contact 66 to raise this contact and break connection thereof with the stationary contact 67 to shut off the buzzer 30 while maintaining engagement between central contact 66 and movable contact 65 to maintain the timer motor 71 and the light 31 in operation. During this interval, the solenoid 55 will again be energized, but the latch 60 is held out due to the lower end thereof engaging against the end of the contact blade 68. Upon raising movement of the central contact 66 and movable contact 65, the blade 68 for the contact 65 is again seated above the latch while the timer cam 73 continues to rotate. As soon as a projection 74 on the timer cam 73 travels past the end of the blade 69 for the central contact 66, the latter contact drops out of engagement with the movable contact 65 to deenergize the timer motor 71 and the light 31. This will then restore the parts to the condition existing before the occurrence of a foul.

Auxiliary contact 80 and 81 are provided with the contact 81 carried on a flexible blade 82 in position to be engaged by a projection 74 on the timer cam 73 to obtain automatic recycling of an automatic pinsetter by connection thereto when a foul is committed.

I claim:

1. A self-contained foul detecting and indicating unit positionable in line with a bowling alley foul line comprising, a housing having a light receiving opening and a light transmitting area directed toward the bowler's end of the alley, means for indicating the occurrence of a foul including an audible signal device and a light for transmitting through said area, means for initiating operation of said indicating means including a normally open circuit contact, a spring-urged latch for holding said contact open, a normally energized solenoid for holding said latch against the spring to maintain the contact open, a resistive type photocell aligned with said light receiving opening and in series with said solenoid, whereby a reduction in light decreases current through said solenoid to a drop out value to permit closure of said contact, and a timing device for said indicating means including a timing motor operable when said contact is closed, a timing cam operable by said motor and engageable with said contact for opening thereof to complete a foul detecting and indicating cycle.

2. A unit as defined in claim 1 including a capacitor for imposing a time delay in drop out of said solenoid and potentiometer means for varying the interval of said time delay.

3. A self-contained foul detecting and indicating unit positionable in line with a foul line of a bowling alley comprising, a housing having a light receiving opening for transmission of light to the interior of the housing, a light transmitting area directed generally toward a bowler's end of the alley, and a foul indicating light positioned within the housing to emit light through said area, and means to illuminate said light upon the occurrence of a foul.

4. A self-contained foul detecting and indicating unit positionable adjacent a bowling alley foul line comprising, a housing with a light receiving opening, a first circuit within said housing including means for indicating the occurrence of a foul upon the closure of the circuit, and means for closing said circuit upon the occurrence of a foul including, a foul detecting circuit under said housing having a resistance type photocell aligned with said opening, a current responsive member directly connected in circuit to said photocell effective to complete said first circuit when diminished light impinges on said cell, and means in the foul detecting circuit for imposing a time delay in operation of said current responsive member.

5. In a bowling alley installation, a bowling alley having a foul line extending thereacross, a self-contained foul detecting and indicating unit at said bowling alley foul line comprising, a housing having a light receiving opening and a light transmitting window, means within the housing for indicating a foul including a buzzer and a light positioned to emit rays through said window, and means including a resistive type photocell in said housing and a circuit within said housing including said cell for temporarily energizing said light and buzzer upon the occurrence of a foul.

6. A self-contained foul detecting and indicating unit for placement at a bowling alley foul line comprising, a housing having a light transmitting window, means within the housing for indicating a foul, and a light responsive circuit including a resistive type photocell within said housing for temporarily energizing said foul indicating means upon the occurrence of a foul.

7. A self-contained foul detecting and indicating unit operable in cooperation with a beam from an external source of light, and constructed for installation along the side of a bowling alley at a foul line on the surface of the alley, said unit comprising: a frame; a complete system of foul detecting and indicating components mounted on said frame, said components comprising a normally inoperative foul indicating element for indicating the occurrence of a foul, a relay for actuating the indicating element, and a resistance type photocell for normally operatively receiving the beam from said external source, said photocell being directly connected in series with said relay for rendering the indicating element operative when said beam is broken; means for mounting said frame along the side of the bowling alley at the foul line thereof; and a housing having a light receiving opening aligned with said photocell, said housing enclosing and effectively concealing said frame and said components.

8. A self-contained foul detecting and indicating unit operable in cooperation with a beam from an external source of light, and constructed for installation along the side of a bowling alley at a foul line on the surface of the alley, said unit comprising: a frame; a complete system of foul detecting and indicating components mounted on said frame, said components comprising normally inoperative foul indicating elements including a visual indicator light and an audible signaling device for indicating the occurrence of a foul, a normally energized relay for actuating said indicating elements and including an operating coil and a cooperating contact assembly including a pair of normally open contacts in circuit with said indicating elements and a pair of normally closed contacts in circuit with said audible signaling device, a spring-urged latch normally releasably holding the first said contacts open and releasing the first said contacts responsive to de-energization of said relay for closing the first said contacts and actuating said indicating elements, a resistance type photocell for normally operatively receiving the beam from said external source, said photocell being directly connected in series with said relay coil for de-energizing said relay when the beam of light is broken, potentiometer means in circuit with said relay coil for maintaining said relay energized until said beam has been broken an adjustable, predetermined period of time, a timing device including a cam mechanism actuable for serially opening both pairs of contacts, the second said contacts before the first said contacts and rendering the indicating elements inoperative, the audible signaling device before the visual indicator light, and a motor in circuit with the first said relay contacts and actuated upon closure of the first said contacts for actuating said cam mechanism; means for mounting said frame along the side of a bowling alley at the foul line thereof; and a housing having a light transmitting area adjacent said visual indicator light and a light receiving opening aligned with said photocell, said housing enclosing and effectively concealing said frame and all said components.

9. In a bowling alley installation; a bowling alley having a foul line extending thereacross; foul detecting and indicating equipment including: a self-contained unit installed at one side of said bowling alley and aligned with said foul line, said unit including visual and audible signals operable for indicating a foul, actuating means comprising a resistance type photocell in series with a relay and operable for operating said signals upon occurrence of a foul, and timing means for limiting the duration of operation of said signals, and a housing over said unit and effectively concealing said unit from view; and means at the side of said bowling alley opposite said unit and projecting a beam of light generally along said foul line and onto said photocell for operating said actuating means when said beam is broken and thereby setting off said signals.

10. In a bowling alley installation including a bowling alley having a foul line extending thereacross; foul detecting and indicating equipment including: a self-contained unit adapted to be normally positioned at one side of said bowling alley and aligned with said foul line and including signal means operable for indicating a foul and actuating means operable for operating said signal means upon occurrence of a foul, and a housing over said unit and concealing said unit from view; and means for operating said actuating means upon occurrence of a foul and thereby setting off said signals.

11. A self-contained foul detecting and indicating unit positionable adjacent a bowling alley foul line comprising, a housing with a light receiving opening, a first circuit within said housing including means for indicating the occurrence of a foul upon the closure of the circuit, and means for closing said circuit upon the occurrence of a foul including, a foul detecting circuit under said housing having a resistance type photocell positioned to receive light transmitted through said opening, and a current responsive member directly connected in circuit to said photocell effective to complete said first circuit when diminished light impinges on said cell.

References Cited in the file of this patent

UNITED STATES PATENTS

| | | |
|---|---|---|
| 894,509 | Leupold | July 28, 1908 |
| 1,621,511 | Kempien | Mar. 22, 1927 |
| 2,037,671 | Yannes | Apr. 14, 1936 |
| 2,200,551 | Hinckley | May 14, 1940 |
| 2,425,258 | MacLagan et al. | Aug. 5, 1947 |
| 2,664,290 | Swift | Dec. 29, 1953 |
| 2,683,602 | Dumas et al. | July 13, 1954 |